United States Patent
Schulte

(10) Patent No.: US 10,361,544 B2
(45) Date of Patent: Jul. 23, 2019

(54) CABLE AND/OR SOCKET HOLDER

(71) Applicant: HSK-Schulte GmbH, Meinerzhagen (DE)

(72) Inventor: Steffen Schulte, Dortmund (DE)

(73) Assignee: HSK-SCHULTE GMBH, Meinerzhagen (DE)

( * ) Notice: Subject to any disclaimer, the term of this patent is extended or adjusted under 35 U.S.C. 154(b) by 0 days.

(21) Appl. No.: 15/631,070

(22) Filed: Jun. 23, 2017

(65) Prior Publication Data
US 2018/0366926 A1 Dec. 20, 2018

(30) Foreign Application Priority Data

Mar. 8, 2017 (DE) .................. 10 2017 104 881
Mar. 27, 2017 (DE) .................. 10 2017 106 520

(51) Int. Cl.
| F16L 3/24 | (2006.01) |
| H02G 3/04 | (2006.01) |
| H02G 3/10 | (2006.01) |
| H02G 3/32 | (2006.01) |
| F16L 3/127 | (2006.01) |

(52) U.S. Cl.
CPC .......... *H02G 3/0456* (2013.01); *F16L 3/127* (2013.01); *H02G 3/105* (2013.01); *H02G 3/32* (2013.01)

(58) Field of Classification Search
USPC ...... 248/689, 690, 692, 49, 58, 60, 62, 67.7, 248/68.1, 69, 70, 72, 74.1, 74.2, 74.3, 248/229.11, 229.16, 228.7, 230.1, 230.7, 248/230.8, 231.81, 231.85, 316.1, 906; 174/60, 64, 135
See application file for complete search history.

(56) References Cited

U.S. PATENT DOCUMENTS 3,228,640 A * 1/1966 Wolsh .............. F16L 3/00
                                               24/339
3,778,537 A * 12/1973 Miller .............. H01Q 1/1228
                                               174/138 R
(Continued)

FOREIGN PATENT DOCUMENTS

| CH | 669872 | 4/1989 |
| DE | 3511265 A1 | 10/1986 |

(Continued)

OTHER PUBLICATIONS

Office Action from German Priority Application No. 10 2017 106 520.2 dated Nov. 13, 2017.

*Primary Examiner* — Terrell L McKinnon
*Assistant Examiner* — Michael McDuffie
(74) *Attorney, Agent, or Firm* — Massina Pat & TM Law PLLC

(57) ABSTRACT

A cable holder for holding a cable along an at least substantially cylindrical bearing structure, the cable holder including a fastening ring (10) which comprises an axially extending gap (11) for laterally fitting it onto the bearing structure (2) and which can be elastically spread in order to widen the gap (11); and a holding bracket (20) which projects radially from the outside of the fastening ring (10) and extends in a first circumferential direction and forms a cable accommodation (21) for the cable (5) and comprises a free bracket end (24) at which the cable (5) can be inserted into the cable accommodation (21).

13 Claims, 4 Drawing Sheets

(56) References Cited

U.S. PATENT DOCUMENTS

| | | | | |
|---|---|---|---|---|
| 4,407,472 A * | 10/1983 | Beck | A62C 33/04 | 24/339 |
| 4,538,782 A * | 9/1985 | Kirschenbaum | H02G 3/32 | 174/171 |
| 4,993,961 A * | 2/1991 | Hisatomi | F16L 3/223 | 248/68.1 |
| 5,308,253 A | 5/1994 | Maki | | |
| 6,141,838 A * | 11/2000 | Cooper | A45D 40/00 | 24/329 |
| 6,328,459 B1 * | 12/2001 | Adams | A47K 1/09 | 362/396 |
| 6,517,032 B1 * | 2/2003 | Gretz | F16L 3/133 | 248/62 |
| 7,055,784 B2 | 6/2006 | Stigler | | |
| 7,131,170 B2 * | 11/2006 | Weaver | A46B 17/02 | 24/545 |
| 7,223,122 B2 | 5/2007 | Mori | | |
| 7,297,874 B2 * | 11/2007 | Yasuda | B60R 16/0215 | 174/135 |
| 7,614,593 B2 * | 11/2009 | McClure | E21B 17/1035 | 248/229.14 |
| 8,640,323 B2 * | 2/2014 | Kodi | E04C 5/167 | 29/243.56 |
| 8,833,706 B2 * | 9/2014 | Elsmore | H02G 3/32 | 138/106 |
| 8,851,150 B2 * | 10/2014 | Yamase | B60J 1/2047 | 160/382 |
| 8,888,337 B2 * | 11/2014 | Adams, IV | F21V 21/088 | 362/287 |
| 2007/0114340 A1 * | 5/2007 | Adams | F16L 3/127 | 248/72 |
| 2010/0230550 A1 * | 9/2010 | Powers | F16L 3/24 | 248/58 |
| 2011/0011989 A1 * | 1/2011 | Samolej | F16L 3/085 | 248/74.3 |
| 2013/0061857 A1 * | 3/2013 | McNally | A61B 50/20 | 128/852 |
| 2013/0320158 A1 * | 12/2013 | Wu | B65D 63/10 | 248/69 |
| 2014/0117171 A1 * | 5/2014 | Mori | G10D 13/00 | 248/69 |

FOREIGN PATENT DOCUMENTS

| | | |
|---|---|---|
| EP | 1535536 A1 | 6/2005 |
| JP | 2005117720 A | 4/2005 |
| KR | 1020140024037 A | 2/2014 |

* cited by examiner

CABLE AND/OR SOCKET HOLDER

This application claims priority to German Patent Application No. 10 2017 104 881.2, filed Mar. 8, 2017, and German Patent Application No. 10 2017 106 520.2, filed Mar. 27, 2017, each of which is incorporated herein by reference.

FIELD OF THE INVENTION

The invention relates to a cable holder for holding a cable on an at least substantially cylindrical bearing structure. The invention also relates to a socket holder for holding an electrical socket on an at least substantially cylindrical bearing structure. The bearing structure can in particular be a tube of a crossbeam, for example a crossbeam of a trade fair installation. The crossbeam can for example be held suspended on a ceiling, such as for example the ceiling of an exhibition hall.

BACKGROUND OF THE INVENTION

Crossbeams comprise substantially two static elements, one or more main or chord tubes and braces. The thicker of the two tubes, which extends along the entire length of the crossbeam, is typically referred to as the chord tube. Struts between the chord tubes are referred to as braces. The struts serve primarily to stabilise the crossbeam. Loads and/or forces should only be directly introduced into the chord tubes and not into the struts. The number of chord tubes can vary, depending on the type of crossbeam. Crossbeams are thus sub-divided into two-point crossbeams, three-point crossbeams (triangle crossbeams) and four-point crossbeams (box crossbeams). There are also one-point crossbeams; a simple tube with no braces is referred to as such. The cable holder in accordance with the invention can be used with all types of crossbeams.

Electrical apparatus hung on crossbeams or other scaffolds usually require power and control information, for which reason crossbeam and stage constructions guide a multitude of lines, for example for power, data, pressurised air or water. For an improved appearance, these lines have hitherto been sorted and/or organised in the crossbeam construction using adhesive tape or cable ties. Fastening them using adhesive tape and cable ties is laborious and time-consuming. In order to latterly fasten additional lines, it is necessary to use new or additional adhesive tapes or cable ties.

SUMMARY OF THE INVENTION

It is an object of the invention to be able to install lines and/or electrical sockets quickly and easily along crossbeams and other scaffolds or, in more general terms, along at least substantially cylindrical bearing structures and to provide a fastening means which is suitable for this purpose. The fastening means should be reusable in order to reduce expense on consumables such as cable ties, adhesive tapes, etc. and in order to avoid waste.

The subject of the invention is a cable holder for holding a cable along an at least substantially cylindrical bearing structure. The bearing structure can in particular be a bearing tube or chord tube of a crossbeam or other scaffold.

The cable holder comprises a fastening ring featuring an axially extending gap. The fastening ring can be elastically spread in order to widen the gap, such that it can be fitted laterally, i.e. at least substantially orthogonally with respect to the longitudinal direction of the bearing structure, onto the bearing structure via the spread-open gap. The width of the gap as measured in the circumferential direction of the fastening ring is preferably smaller than the diameter of the bearing tube. If the bearing tube is not circular, the gap width is preferably smaller than a minimum tube width as measured in the cross-section of the bearing tube. Conversely, the gap width is preferably large enough that the fastening ring is elastically spread open and the gap thus widened when the fastening ring is pressed against the bearing structure via the gap. If the gap width is dimensioned in this way, the fastening ring can be fitted and/or snapped on using one hand only.

In advantageous embodiments, a free inner cross-section of the fastening ring is dimensioned such that the fastening ring, when fitted, surrounds the bearing structure in a frictional fit. When fitted, the fastening ring is preferably exposed to a certain spring tensing force, in order to create or augment the frictional fit. It is advantageous if the fastening ring, when fitted, can be shifted in the longitudinal direction and/or rotated in the circumferential direction of the bearing structure and is fixed in the respective position in a frictional fit due to an inner cross-section which is adapted to the bearing structure.

The cable holder comprises a holding bracket which projects outwards from the fastening ring at the circumference of the fastening ring and protrudes in a first circumferential direction. In the direction of the fastening ring, the holding bracket forms an accommodation for at least one cable. The holding bracket comprises a free bracket end, such that an opening is created at the bracket end through which one or more cables can be laterally inserted into the accommodation. In an initial state in which it is free of external forces, the holding bracket can abut the fastening ring or a structure which projects outwards from the fastening ring in the region of the free bracket end, preferably in such embodiments with an elastic tensing force in the initial state. In alternative embodiments, it can however also exhibit a clear distance from the fastening ring in the region of the free bracket end in the initial state, such that an opening which is a free opening when a load is not imposed is provided at the free bracket end. Although the holding bracket can be inflexible in such embodiments, it is also preferred in these embodiments if the free bracket end of the holding bracket can be elastically bent away from and/or towards the fastening ring, in order to be able to increase and/or decrease the size of the opening.

In developments, the holding bracket can be fixed to the fastening ring. When it is fixed, the accommodation for the one or more cables is closed. Expediently, it is releasably fastened, so that an accommodated cable can be removed again from the cable accommodation. Advantageously, it can also be fixed again after it has been released. By enabling the holding bracket to be fixed, it is possible to prevent a cable from inadvertently slipping out of the cable accommodation. A holding bracket which can be fixed can accommodate greater loads, when it is fixed, than a holding bracket which is equally strong in terms of being able to bend away from the fastening ring but which is not embodied such that it can be fixed. Enabling it to be fixed is in particular advantageous when the fastening ring is disposed on the bearing structure such that the holding bracket points downwards and is exposed to the load of the weight of the accommodated cable or cables.

In advantageous embodiments, the holding bracket is releasably fixed using a hooked engagement. To this end, the holding bracket comprises a bracket hook, and the fastening ring comprises a ring hook. Starting from an initial state of the cable holder, the bracket hook can be moved into hooked engagement with the ring hook by pivoting the holding bracket towards the fastening ring. In the hooked engagement, the holding bracket is releasably latched to the fastening ring.

The cable holder can be developed into a socket holder. Alternatively or additionally, it can be developed into a protector, for example a friction protector, which can be fitted laterally onto a bearing tube.

The invention is directed not only to a cable holder but also to a socket holder for holding an electrical socket on an at least substantially cylindrical bearing structure. The socket holder comprises a fastening ring which comprises an axially extending gap for laterally fitting it onto the bearing structure and which can be elastically spread in order to widen the gap. The socket holder can additionally comprise the holding bracket described, but need not be developed into the cable holder. The statements regarding the fastening ring made above in connection with the cable holder, such as do not relate to a cable holding function, also apply to the fastening ring of a socket holder which is solely a socket holder.

The socket holder comprises a socket mounting for holding an electrical socket. The socket mounting comprises: a first socket holding structure which projects radially and/or tangentially outwards from the fastening ring at the circumference of the fastening ring; and a second socket holding structure which projects radially and/or tangentially outwards from the fastening ring and is arranged and shaped on the fastening ring such that an electrical socket can be arranged between the socket holding structures and, when arranged between the socket holding structures, is held on two opposite sides by the socket holding structures. The invention also relates to a combination of the socket holder and an electrical socket which is held by the socket mounting.

The socket holder can be developed into a socket and cable holder if it comprises a holding bracket as described with respect to the cable holder. In other developments, the socket holder is configured for an additional function as a friction protector or as a protector in general for the bearing structure. As already mentioned, the functions of the socket mounting and cable mounting and the protective function can also be implemented simultaneously.

The cable and/or socket holder serves to hold, fasten and/or guide cables and/or socket strips on crossbeams and scaffolds. It can in particular be used in the field of event engineering, exhibit stand construction and staging.

Lastly, the invention is also directed to a protector structure, in particular a friction-protector structure, for an at least substantially cylindrical bearing structure of the type already mentioned. The protector structure comprises the fastening ring described with respect to the cable holder and socket holder and additionally comprises one or more guides, (each) for a bearing rope, which is/are circumferential at the outer circumference of the fastening ring. The protector structure can easily be fitted from the side onto the bearing structure to be protected, as already described with respect to the cable holder, due to the axially extending gap in the fastening ring. One or more bearing ropes, which serve to fasten and suspend the bearing structure, can be wound around it when it is fitted. The guide, or as applicable the multiple guides, can (each) be shaped as a flat groove on the outer circumference of the fastening ring. Instead of one or more flat grooves, the one or more guides can also (each) be formed by at least one protruding fin which is at least partially circumferential at the outer circumference of the fastening ring.

The protector structure can comprise the holding bracket described above and/or the socket mounting described above, in order to be able to additionally perform the function(s) of a cable holder and/or socket holder.

As already mentioned, the structure in accordance with the invention can be configured to perform only one, or a combination of any two, or each of the following three functions:

Function 1: guiding or organising one or more cables by means of holding brackets;

Function 2: fastening an electrical socket, for example a multi-outlet socket;

Function 3: friction protector and/or protection against constriction.

The structure in accordance with the invention can thus be a cable holder and/or a socket holder and/or a protector structure for an at least substantially cylindrical bearing structure, such as in particular a bearing tube of a crossbeam or other scaffold.

Features of the invention are also described in the aspects formulated below. The aspects are worded in the manner of claims and can be substituted for them. Features disclosed in the aspects can also supplement and/or qualify the claims, indicate alternatives to individual features and/or broaden claim features. Bracketed reference signs refer to example embodiments of the invention which are illustrated below in figures. They do not restrict the features described in the aspects to their literal sense as such, but do conversely indicate preferred ways of implementing the respective feature.

Aspect 1—A cable holder for holding a cable along an at least substantially cylindrical bearing structure (2), the cable holder comprising: a fastening ring (10) which comprises an axially extending gap (11) for laterally fitting it onto the bearing structure (2) and which can be elastically spread in order to widen the gap (11); and a holding bracket (20) which projects radially from the outside of the fastening ring (10) and extends in a first circumferential direction and forms a cable accommodation (21) for the cable (5) and comprises a free bracket end (24) at which the cable (5) can be inserted into the cable accommodation (21).

Aspect 2—The cable holder according to the preceding aspect, wherein the holding bracket (20) comprises a bracket hook (25), and the fastening ring (10) comprises a ring hook (15), and starting from an initial state of the cable holder, the bracket hook (25) can be moved into hooked engagement with the ring hook (15) by pivoting the holding bracket (20) towards the fastening ring (10), preferably against a spring force of the holding bracket (20).

In the hooked engagement, the holding bracket can securely enclose the cable accommodation and thus one or more accommodated cables. A cable can be prevented from inadvertently slipping out when being installed. If the cable holder is fitted with the holding bracket downwards, at least some of the weight of cables can be accommodated in the hooked engagement, such that the holding bracket can hold a greater weight than a holding bracket which is not secured. This counteracts material fatigue. The bracket hook can be provided at or near to the free bracket end. It can in particular form an axial partial region of the free bracket end.

Aspect 3—The cable holder according to the preceding aspect, wherein the holding bracket (20) is elastically deformed in the hooked engagement and holds the bracket hook (25) with a spring force in the hooked engagement with the ring hook (15).

Aspect 4—The cable holder according to any one of the immediately preceding two aspects, wherein in the initial state of the cable holder, the ring hook (15) lies opposite the bracket hook (25) in the radial and/or tangential direction of the fastening ring (10) and prevents the holding bracket (20) from pivoting freely by way of an abutment contact with the bracket hook (25).

Aspect 5—The cable holder according to any one of the immediately preceding three aspects, wherein the fastening ring (10) comprises an axial abutment (13, 14) which axially secures the bracket hook (25) in the hooked engagement by way of an axial abutment contact with the holding bracket (20).

Aspect 6—The cable holder according to any one of the immediately preceding four aspects, wherein the free bracket end (24) is broader in the axial direction of the fastening ring (10) than the bracket hook (25), and the bracket hook (25) is arranged in axial asymmetry in the circumferential direction at or near the bracket end (24).

Aspect 7—The cable holder according to any one of the immediately preceding five aspects, wherein the holding bracket (20) comprises an insertion lip (26) for a cable (5) at the free bracket end (24), axially next to the bracket hook (25).

Aspect 8—The cable holder according to any one of the preceding aspects, wherein the fastening ring (10) comprises a bracket accommodation (13) at its circumference, preferably a recess in the outer circumference or a passage through the circumference of the fastening ring (10), with which a bracket portion (28) of the holding bracket (20) which is near the free bracket end (24) engages or into which it can be pressed, for example in order to close the cable accommodation (21).

The recess, preferably a breach, can axially secure the holding bracket in at least one and preferably both directions. An axially left-hand side wall of the recess can form a left-hand axial abutment for the holding bracket. An axially right-hand side wall of the recess can form a right-hand axial abutment for the holding bracket. The left-hand and/or right-hand side wall can (each) rise radially outwards at the outer circumference of the fastening ring, in order to more reliably ensure the abutting function. An end portion of the holding bracket which forms the free bracket end can be U-shaped or shaped like a "swan's neck".

Aspect 9—The cable holder according to any one of the preceding aspects, comprising an elongated flexible holding means (7) which is connected to the fastening ring (10), with tensile strength in the first circumferential direction, at a first holding element (17) of the fastening ring (10) and connected to the holding bracket (20), with tensile strength counter to the first circumferential direction, at a second holding element (27) of the holding bracket (20) and which extends through the cable accommodation (21) in the circumferential direction.

Aspect 10—The cable holder according to the preceding aspect, wherein the flexible holding means (7) can be elastically stretched between the holding elements (17, 27) and is for example a rubber ring or band.

Aspect 11—The cable holder according to any one of the immediately preceding two aspects, wherein the second holding element (27) is provided outside of the cable accommodation (21) in the circumferential direction of the fastening ring (10).

Aspect 12—The cable holder according to any one of the immediately preceding three aspects, wherein the second holding element (27) is formed at or near to the free bracket end (24).

Aspect 13—The cable holder according to any one of the immediately preceding four aspects, wherein the flexible holding means (7) is releasably connected to the first holding element (17) and/or releasably connected to the second holding element (27).

The flexible holding means can in particular be a ring which can be elastically stretched, for example a simple rubber ring. At least one of the holding elements can comprise a free end, such that a holding element which is for example formed as a ring can be suspended on the relevant holding element.

Aspect 14—The cable holder according to any one of the preceding aspects, wherein a first holding element (17) projects from the fastening ring (10), preferably in the circumferential direction, forming a free end, and/or a second holding element (27) projects from the holding bracket (20) at or near to the free bracket end (24), preferably in the circumferential direction, forming a free end, such that an elongated flexible holding means (7) can be held under tensile stress on the first holding element (17) and/or the second holding element (27), such that it releasably encompasses the first holding element (17) and/or the second holding element (27).

Aspect 15—The cable holder according to any one of Aspects 9 to 14, wherein a circumferential region in which the first holding element (17) projects from the fastening ring (10) extends in the first circumferential direction at most up to and below the holding bracket (20), preferably at most up to a connecting region (22) between the fastening ring (10) and the holding bracket (20), and counter to the first circumferential direction at most up to the gap (11) in the fastening ring (10).

Aspect 16—The cable holder according to any one of the preceding aspects and Aspect 2, wherein a holding element (27) for fastening a flexible holding means (7) which can be exposed to tensile stress projects from the holding bracket (20), offset with respect to the bracket hook (25), in the axial direction of the fastening ring (10).

Aspect 17—The cable holder according to the preceding aspect, wherein the holding element (27) projects axially next to the bracket hook (25) at the free bracket end (24).

Aspect 18—The cable holder according to any one of the preceding aspects, further comprising a socket mounting (30) for an electrical socket (8).

Aspect 19—The cable holder according to the preceding aspect, wherein a first socket holding structure (31) and a second socket holding structure (32) of the socket mounting (30) project outwards from the fastening ring (10), and an electrical socket (8) can be arranged between the socket holding structures (31, 32) and, when arranged between the socket holding structures (31, 32), is held on two opposite sides by the socket holding structures (31, 32).

Aspect 20—The cable holder according to the preceding aspect, wherein: the first socket holding structure (31) comprises a first contact region (35), and the second socket holding structure (32) comprises a second contact region (35); the first contact region (35) lies opposite and faces the second contact region (35) at a clear distance; the clear distance is smaller than a breadth of an electrical socket (8); and the socket holding structures (31, 32) can be elastically bent away from each other, such that the electrical socket can be arranged between the socket holding structures (31, 32).

Aspect 21—The cable holder according to the preceding aspect, wherein in the contact regions (35), the socket holding structures (31, 32) press with a spring force against an electrical socket (8) arranged between the socket holding structures (31, 32).

Aspect 22—The cable holder according to any one of the immediately preceding two aspects, wherein the first socket holding structure (31) comprises a first detent in the first contact region (35) and/or the second socket holding structure (32) comprises a second detent in the second contact region (35), in order to be able to hold an electrical socket (8), arranged between the socket holding structures (31, 32), in a locking engagement with the detents.

Aspect 23—The cable holder according to any one of the immediately preceding four aspects, wherein the socket holding structures (31, 32) are spaced from each other in the circumferential direction of the fastening ring (10).

Aspect 24—The cable holder according to any one of the immediately preceding five aspects, wherein a third socket holding structure (33) projects radially outwards from the fastening ring (10), axially next to the first socket holding structure (31) at a clear distance, and a fourth socket holding structure (34) projects radially outwards from the fastening ring (10), axially next to the second socket holding structure (32) at a clear distance, and an electrical socket (8) can be arranged between the socket holding structures (31, 32, 33, 34) and, when arranged between the socket holding structures (31, 32, 33, 34), is held on two opposite sides by the socket holding structures (31, 32, 33, 34).

Aspect 25—The cable holder according to any one of the preceding aspects, wherein the holding bracket (20) comprises a first bracket strip (23a) extending in the circumferential direction and, axially offset with respect to the first bracket strip (23a), a second bracket strip (23b) extending in the circumferential direction, wherein the bracket strips (23a, 23b) are connected to each other axially at or near to the free bracket end (24) and exhibit a clear distance from each other axially, from the fastening ring (10) up to the connection at or near to the free bracket end (24), such that a bearing rope (6) can wind around the fastening ring (10), axially between the bracket strips (23a, 23b), in order to fasten and suspend the bearing structure (1).

Aspect 26—The cable holder according to the preceding aspect and any one of Aspects 9 to 16, wherein the circumference of the fastening ring (10) comprises a bracket accommodation (13), preferably a recess in the outer circumference or a passage through the fastening ring (10), wherein the holding element (27) of the holding bracket (20) can engage with or be pressed into the bracket accommodation (13) when the holding bracket (20) is closed.

Aspect 27—The cable holder according to any one of the preceding aspects and Aspect 24, wherein the respectively axially adjacent socket holding structures (31, 32, 33, 34) exhibit a clear distance from each other axially, up to the outer circumference of the fastening ring (10), such that a bearing rope (6) can wind around the fastening ring (10), axially between the socket holding structures (31, 32, 33, 34), in order to fasten and suspend the bearing structure (1).

Aspect 28—The cable holder according to any one of the preceding aspects, wherein in the circumferential region of the cable accommodation (21) and/or in the circumferential region of the socket mounting (30) according to any one of Aspects 18 to 24, the outer circumference of the fastening ring (10) comprises a guide (12) extending in the circumferential direction, preferably a recess, for a bearing rope (6).

Aspect 29—The cable holder according to any one of the preceding aspects, wherein in the circumferential region below the holding bracket (20), the outer circumference of the fastening ring (10) comprises a guide (12) extending in the circumferential direction, preferably a recess, for axially securing a bearing rope (6), wherein the guide (12) preferably extends up to the gap (11) in the fastening ring (10).

Aspect 30—The cable holder according to any one of the preceding aspects, wherein the holding bracket (20) can be elastically bent towards an outer circumference of the fastening ring (10).

Aspect 31—A socket holder for holding an electrical socket on an at least substantially cylindrical bearing structure (2), the socket holder comprising: a fastening ring (10) which comprises an axially extending gap (11) for laterally fitting it onto the bearing structure (2) and which can be elastically spread in order to widen the gap (11); and a socket mounting (30), featuring a first socket holding structure (31) which projects outwards from the fastening ring (10) and a second socket holding structure (32) which projects outwards from the fastening ring (10), wherein an electrical socket (8) can be arranged between the socket holding structures (31, 32) and, when arranged between the socket holding structures (31, 32), is held on two opposite sides by the socket holding structures (31, 32).

Aspect 32—The socket holder according to the preceding aspect, wherein: the first socket holding structure (31) comprises a first contact region (35), and the second socket holding structure (32) comprises a second contact region (35); the first contact region (35) lies opposite and faces the second contact region (35) at a clear distance; the clear distance is smaller than a breadth of an electrical socket (8); and the socket holding structures (31, 32) can be elastically bent away from each other, such that the electrical socket can be arranged between the socket holding structures (31, 32).

Aspect 33—The socket holder according to the preceding aspect, wherein in the contact regions (35), the socket holding structures (31, 32) press with a spring force against an electrical socket (8) arranged between the socket holding structures (31, 32).

Aspect 34—The socket holder according to any one of the immediately preceding two aspects, wherein the first socket holding structure (31) comprises a first detent in the first contact region (35) and/or the second socket holding structure (32) comprises a second detent in the second contact region (35), in order to be able to hold an electrical socket (8), arranged between the socket holding structures (31, 32), in a locking engagement with the detents.

Aspect 35—The socket holder according to any one of the immediately preceding four aspects, wherein the socket holding structures (31, 32) are spaced from each other in the circumferential direction of the fastening ring (10).

Aspect 36—The socket holder according to any one of the immediately preceding five aspects, wherein a third socket holding structure (33) projects radially outwards from the fastening ring (10), axially next to the first socket holding structure (31) at a clear distance, and a fourth socket holding structure (34) projects radially outwards from the fastening ring (10), axially next to the second socket holding structure (32) at a clear distance, and an electrical socket (8) can be arranged between the socket holding structures (31, 32, 33, 34) and, when arranged between the socket holding structures (31, 32, 33, 34), is held on two opposite sides by the socket holding structures (31, 32, 33, 34).

Aspect 37—The socket holder according to the preceding aspect, wherein the respectively axially adjacent socket holding structures (31, 32, 33, 34) exhibit a clear distance from each other axially, up to the outer circumference of the fastening ring (10), such that a bearing rope (6) can wind around the fastening ring (10), axially between the socket holding structures (31, 32, 33, 34), in order to fasten and suspend the bearing structure (1).

Aspect 38—The socket holder according to any one of the immediately preceding seven aspects, further comprising a holding bracket (20) which projects radially from the outside of the fastening ring (10) in a first circumferential direction and forms an accommodation (21) for a cable (5) and comprises a free bracket end (24) at which the cable can be inserted into the accommodation (21).

Aspect 39—The socket holder according to any one of the immediately preceding eight aspects, wherein a cable holder according to any one of Aspects 1 to 30 forms the socket holder.

Aspect 40—The socket holder according to any one of the immediately preceding nine aspects, wherein in the circumferential region of the socket mounting (30), the outer circumference of the fastening ring (10) comprises a guide (12) extending in the circumferential direction, preferably a recess (12), for axially securing a bearing rope (6), wherein the guide (12) preferably extends up to the gap (11).

Aspect 41—The cable holder and/or socket holder according to any one of the preceding aspects, wherein in an initial state in which it is free of external forces, the fastening ring (10) extends in the circumferential direction over an angle of more than 180°, preferably more than 250° and at most 330° or at most 320° or at most 310° or at most 300°.

Aspect 42—The cable holder and/or socket holder according to any one of the preceding aspects, wherein in an initial state of the fastening ring (10) in which it is free of external forces, the gap (11) exhibits a clear width (w) over its entire axial length which is at least as large as a maximum width of a strut (3) which projects from the bearing structure (2), such that the cable holder and/or socket holder can be arranged on the bearing structure (2), surrounding the strut (3), in the region of the gap (11).

Aspect 43—The cable holder and/or socket holder according to any one of the preceding aspects, wherein the gap (11) exhibits a clear width of at least 15 mm or at least 18 mm or at least 21 mm.

Aspect 44—The cable holder and/or socket holder according to any one of the preceding aspects, wherein the fastening ring (10) comprises a free and preferably at least substantially circular inner cross-section which exhibits a radially measured width of at least 40 mm, preferably at least 45 mm.

Aspect 45—The cable holder and/or socket holder according to any one of the preceding aspects, wherein the fastening ring (10) comprises a free and preferably at least substantially circular inner cross-section which exhibits a radially measured width of at most 60 mm, preferably at most 55 mm.

Aspect 46—The cable holder and/or socket holder according to any one of the preceding aspects, wherein the cable holder and/or socket holder is moulded in one piece from plastic in an original-moulding method, preferably an injection moulding method or a generative moulding method.

Aspect 47—The cable holder and/or socket holder according to any one of the preceding aspects, wherein the cable holder and/or socket holder is used to mount and guide one or more cables (5) or the like and/or to mount an electrical socket (8) on an at least substantially cylindrical bearing structure (2), in particular a crossbeam (1) or a bearing scaffold at a major event such as for example a trade fair or festival.

Aspect 48—The cable holder and/or socket holder according to any one of the preceding aspects, which is arranged on an at least substantially cylindrical bearing structure (2) with gap ends of the fastening ring (10), which delineate the gap (11) in the circumferential direction, in an axial overlap with a strut (3) which projects from the bearing structure (2).

BRIEF DESCRIPTION OF THE DRAWINGS

An example embodiment of the invention is described below on the basis of figures. Features disclosed by the example embodiment, each individually and in any combination of features, advantageously develop the subject-matter of the claims and aspects and also the embodiments described at the beginning. There is shown:

DETAILED DESCRIPTION OF THE INVENTION

Figure 1:
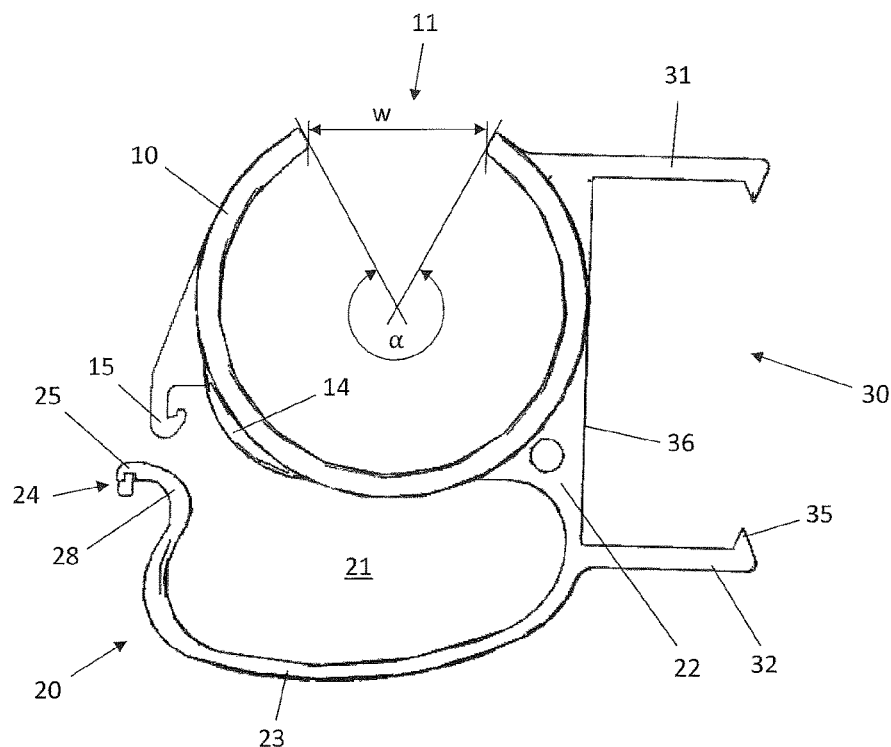
FIG. 1 shows a cable holder in an axial frontal view.

FIG. 1 shows a cable holder in an axial frontal view. The cable holder of the example embodiment is configured to perform each of the functions mentioned at the beginning, i.e. it is simultaneously a cable holder, socket holder and protector structure, wherein only one, or a combination of any two, or all three functions can be selectively used. The multifunctional structure of the example embodiment is referred to in the following, merely for short, as a "cable holder".

The cable holder comprises a fastening ring 10 and a holding bracket 20 which projects in a first circumferential direction on the outside of the circumference of the fastening ring 10, i.e. it projects from the outside of the fastening ring 10 at the circumference and protrudes in the first circumferential direction, in order to form an accommodation 21 for one or more cables. The fastening ring 10 comprises an axially extending gap 11. Although the gap 11 can extend not only axially but additionally also in a tangential direction, for example simply obliquely with respect to the axial direction of the fastening ring 10, embodiments in which the gap 11 is straight and extends exactly axially, as in the example embodiment, are preferred. The fastening ring 10 can be elastically spread for laterally fitting it onto an at least substantially cylindrical bearing structure, for example a chord tube of a crossbeam. When it is fitted, the free gap ends of the fastening ring 10, which delineate the gap 11 in the circumferential direction, are elastically bent away from each other. Once the maximum width of the bearing structure has crossed the gap 11, the fastening ring 10 snaps elastically back again, narrowing the gap 11, such that it partially surrounds the bearing structure and is thus held on the bearing structure.

The cable holder can be adapted to a particular bearing structure, in particular by adapting the free inner cross-section of the fastening ring 10 to the cross-section of the bearing structure. In terms of its free inner cross-section, the fastening ring 10 can be shaped such that when fitted, it is exposed to a certain elastic bending stress and clamps around the bearing structure with a tensing force.

In order to facilitate fitting the fastening ring 10 onto the bearing structure, the gap 11 can exhibit a clear width w, as measured between the gap ends of the fastening ring 10, which is large enough that the gap ends are elastically bent away from each other when the gap ends of the fastening ring 10 are pressed against the bearing structure. If the gap width w is sufficiently large, the pressure against the bearing structure is enough on its own to spread open the fastening ring 10. The user does not have to laboriously spread open the fastening ring 10 but rather can fit the cable holder on using only one hand. It is thus advantageous if the gap width w in an initial state in which the fastening ring 10 is not exposed to a load, i.e. is free of external forces, is more than a third of the maximum cross-sectional width of the bearing structure and/or more than a third of the maximum width of the free inner cross-section of the fastening ring 10. In typical embodiments, the free inner cross-section is circular, such that the maximum width of the free inner cross-section corresponds to the constant diameter of the inner cross-section.

In exhibition stand construction—a preferred area of application—chord tubes of crossbeams usually have a diameter of 50±3 mm. In terms of its free inner cross-section, the fastening ring 10 can be adapted to the bearing structure such that when it is fitted, it is in a frictional fit with the bearing structure, i.e. it clamps around the bearing structure with an elastic tensing force. The diameter of the free inner cross-section of the fastening ring 10 can exhibit an undersize, adapted to the chord tubes, of for example 49±3 mm. The gap width w can be expediently chosen from the range of 20 to 30 mm over the entire length of the gap.

Expressed as an arc angle, it is possible to adapt to the cross-section of the bearing structure onto which the cable holder is to be fitted, such that the fastening ring 10 extends from gap end to gap end over an angle α of more than 180° and at most 330° or more advantageously over at most 320° or even more advantageously over at most 310°. Conversely, extending over at least 250° is advantageous. The fastening ring 10 can in particular extend from gap end to gap end over an angle α of 300°±20°.

The holding bracket 20 projects from the fastening ring 10 in a connecting region 22. A bracket portion 23 extending in the first circumferential direction adjoins the connecting region 22. An end portion 28 which extends up to a free bracket end 24 adjoins the bracket portion 23. In the region of the end portion 28, the holding bracket 20 extends from the bracket portion 23 back towards the fastening ring 10. The end portion 28 extends tangentially and radially with respect to the fastening ring 10. The end portion 28 is shaped in the manner of a "swan's neck", wherein the "beak" points outwards away from the fastening ring 10. Cables can be pushed into the cable accommodation 21 from the side, i.e. tangentially and/or radially with respect to the fastening ring 10, between the free bracket end 24 and the fastening ring 10.

The cable accommodation 21 can be closed and latched against being inadvertently opened. For the purpose of latching, the fastening ring 10 comprises a ring hook 15 and the holding bracket 20 comprises a bracket hook 25 in the region of the free bracket end 24. The bracket hook 25 can be moved into hooked engagement with the ring hook 15 by pivoting the holding bracket 20 towards the fastening ring 10. When pivoted, the holding bracket 20 is elastically bent out of shape.

The ring hook 15 and the bracket hook 25 are shaped so as to be adapted to each other for the hooked engagement. The ring hook 15 projects on the outer circumference of the fastening ring 10 and extends at the free hook end inwards again towards the fastening ring 10, forming a hooked shape. The bracket hook 25 projects outwards away from the fastening ring 10 at the end portion 28. In order to establish the hooked engagement, the holding bracket 20 is elastically bent towards the fastening ring 10, such that the bracket hook 25 of the free bracket end 24 is moved tangentially and also radially towards the fastening ring 10, and the bracket hook 25 passes behind the ring hook 15, i.e. passes between the ring hook 15 and the opposite outer circumference of the fastening ring 10, and grips behind the ring hook 15. The hooks 15 and 25 grip behind each other in the hooked engagement, and the bracket hook 25 of the holding bracket 20 presses against the ring hook 15 from within with an elastic restoring force. A hooked engagement can in principle also be implemented using other hooked shapes. A ring hook 15 in which the free hook end is bent or kinked towards the fastening ring 10, and a bracket hook 25 which correspondingly projects outwards, do however have the advantage that the hooked engagement can be established from without by pressure-actuating the holding bracket 20, and the user does not have to grip within the cable accommodation 21 and bend open the holding bracket 20. As in the example embodiment, the ring hook 15 and the bracket hook 25 can in particular comprise U-shaped or V-shaped inner surfaces which grip behind each other in the hooked engagement. While this is advantageous, it is not absolutely necessary. The inner surfaces can for example also just be L-shaped. In such embodiments, however, the hooks 15 and 25 could slip off each other in the hooked engagement, and the hooked engagement could be released more easily than when the hooks 15 and 25 are embodied with U-shaped or V-shaped ends.

Enabling the holding bracket 20 to be fixed is in particular advantageous with regard to exposing the holding bracket 20 to the load of the weight of accommodated cables. For in many applications, the cable holder will be fitted with the holding bracket 20 pointing downwards, such that the cables rest on the holding bracket 20 and the latter has to accommodate the weight. However, the weight presses the holding bracket 20 into the hooked engagement. The cables are thus also hung "on the hook", which relieves the holding bracket 20. The holding bracket 20 can be formed to be correspondingly thinner and/or can accommodate a greater weight than a holding bracket which cannot be latched.

A clear gap between the ring hook 15 and the bracket hook 25 can be seen in the cross-section and the axial view of FIG. 1. While the clear gap can in principle exist when a load is not imposed on the holding bracket 20, the free bracket end 24 does however in preferred embodiments abut the fastening ring 10 in a loose pressing contact but otherwise freely, wherein the holding bracket 20 can press the free bracket end 24 against the fastening ring 10 with a certain elastic tensing force. In the example embodiment, such pressing contact can in particular exist between the ring hook 15 and the bracket hook 25. So that the user does not have to grip within the cable accommodation 21 to insert a cable and bend open the holding bracket 20 when it is in pressing contact, the free bracket end 24 and/or the ring hook 15 can be shaped such that they taper towards each other from without in the shape of a funnel in the pressing contact, such that the respective cable can be moved into the funnel when inserted and can be pressed against the free bracket end 24 in the funnel, such that the holding bracket 20 is bent outwards out of the pressing contact, and the opening for inserting the cable which can be seen in FIG. 1 is created.

The cable holder is developed into a socket holder. It comprises a socket mounting 30 for an electrical socket, for example a multi-outlet socket. The socket mounting 30 comprises a first socket holding structure 31 and a second socket holding structure 32. The socket holding structures 31 and 32 project freely outwards at the circumference of the fastening ring 10. They are formed as holding arms for holding an electrical socket.

The socket holding structures 31 and 32 exhibit a distance from each other in the circumferential direction or, more specifically, tangentially in relation to the fastening ring 10, wherein said distance is adapted to the breadth of the electrical socket to be held. At the free ends of the socket holding structures 31 and 32, the electrical socket can be pushed between the socket holding structures 31 and 32 from without and thus inserted into the socket mounting 30. The base region of the socket mounting 30, which is near the fastening ring 10 and in which the socket holding structures 31 and 32 are connected to the fastening ring 10, comprises a socket support area 36 which is shaped so as to be adapted to an underside of the electrical socket to be held and which can in particular comprise a planar external surface, as in the example embodiment. If the socket support area 36 is shaped accordingly, the electrical socket can lie against it over an area when it is being held.

Each of the free ends of the socket holding structures 31 and 32 comprises a contact region 35 for establishing a holding engagement with the electrical socket. The contact region 35 of each socket holding structure 31 and 32 projects towards the respectively opposite socket holding structure 31 and 32. The contact regions 35 thus narrow the insertion opening of the socket mounting 30. The contact regions 35 of the socket holding structures 31 and 32 which protrude towards each other are formed as holding hooks or holding detents for the electrical socket. The contact regions 35 exhibit a distance from the socket support area 36, as measured in the longitudinal direction of the respective socket holding structure 31 and 32, which is adapted to the electrical socket to be held.

Figure 5:
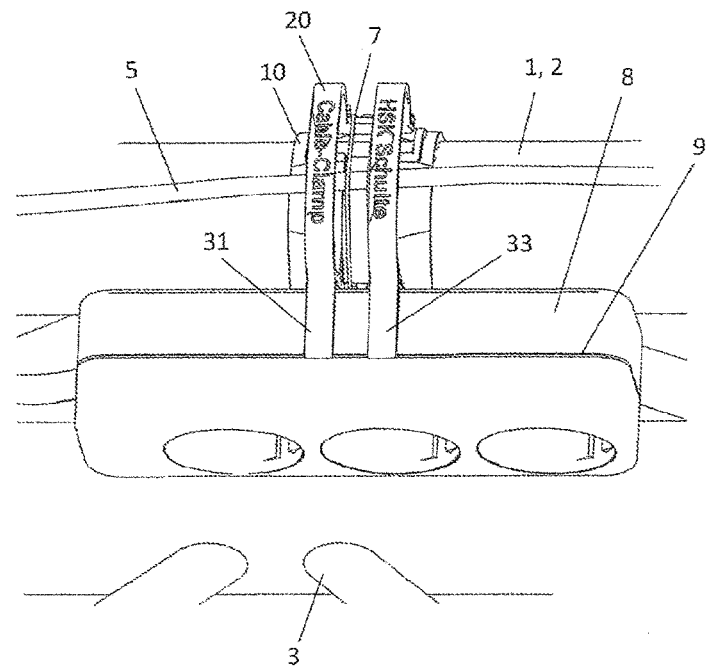
FIG. 5 shows the cable holder fitted onto a chord tube of a crossbeam and holding a cable and an electrical multi-outlet socket.

Electrical sockets typically comprise a housing composed of two half-shells, wherein a seam, i.e. a gap which is circumferential around the outside, is created between the half-shells when they are assembled. In FIG. 5, the cable holder is holding such an electrical socket 8 featuring said gap 9, with which the socket holding structures can engage. The distance which the contact regions 35 exhibit from the socket support area 36 is dimensioned such that the contact regions 35 of the socket holding structures 31 and 32 engage with the gap in the electrical socket, such that a holding engagement with the electrical socket can be established which is sufficiently firm but which can be released again without using tools. The distance which the socket holding structures 31 and 32 exhibit from each other, as measured in the circumferential direction or tangentially, can in particular be dimensioned such that the socket holding structures 31 and 32 are elastically bent away from each other when an electrical socket is inserted, and their contact regions 35 snap forwards into the gap in the electrical socket when said gap reaches the contact regions 35 as it is being inserted. It would in principle also be conceivable to hold the electrical socket exclusively by way of a pressing contact, i.e. in frictional contact with the contact regions 35. The socket holding structures 31 and 32 would however be permanently bent away while an electrical socket was being held and would therefore be subject to material fatigue. In addition, the holding engagement would be less secure. The electrical socket could gradually shake itself loose when exposed to percussive loads such as for example vibration movements of the bearing structure.

The socket mounting 30 is arranged in a circumferential region in which the holding bracket 20 projects from the fastening ring 10. In the cross-section and the axial view of FIG. 1, the first socket holding structure 31 projects from the fastening ring 10 in the vicinity of the gap 11, and the second socket holding structure 32 projects from the holding bracket 20 on the rear side facing away from the free bracket end 24. The socket mounting 30 thus extends in the direction of a maximum extent of the cable holder. Positioning the socket holding structures 31 and 32 along the direction of the maximum extent of the cable holder helps to achieve a compact design of the cable holder.

Figure 2:
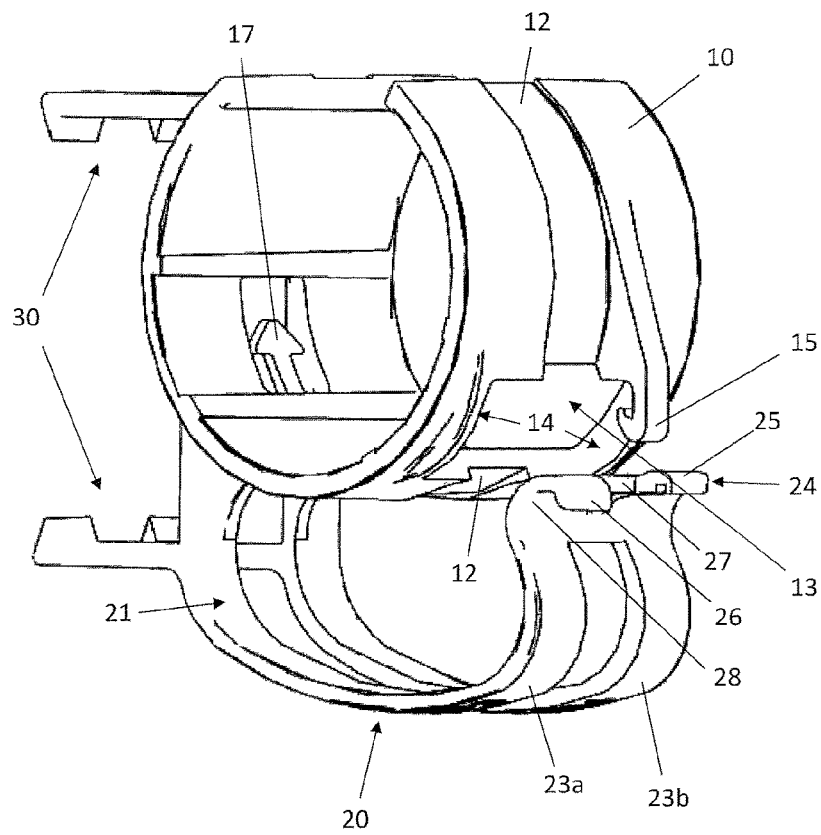
FIG. 2 shows the cable holder in a first perspective view.
Figure 3:
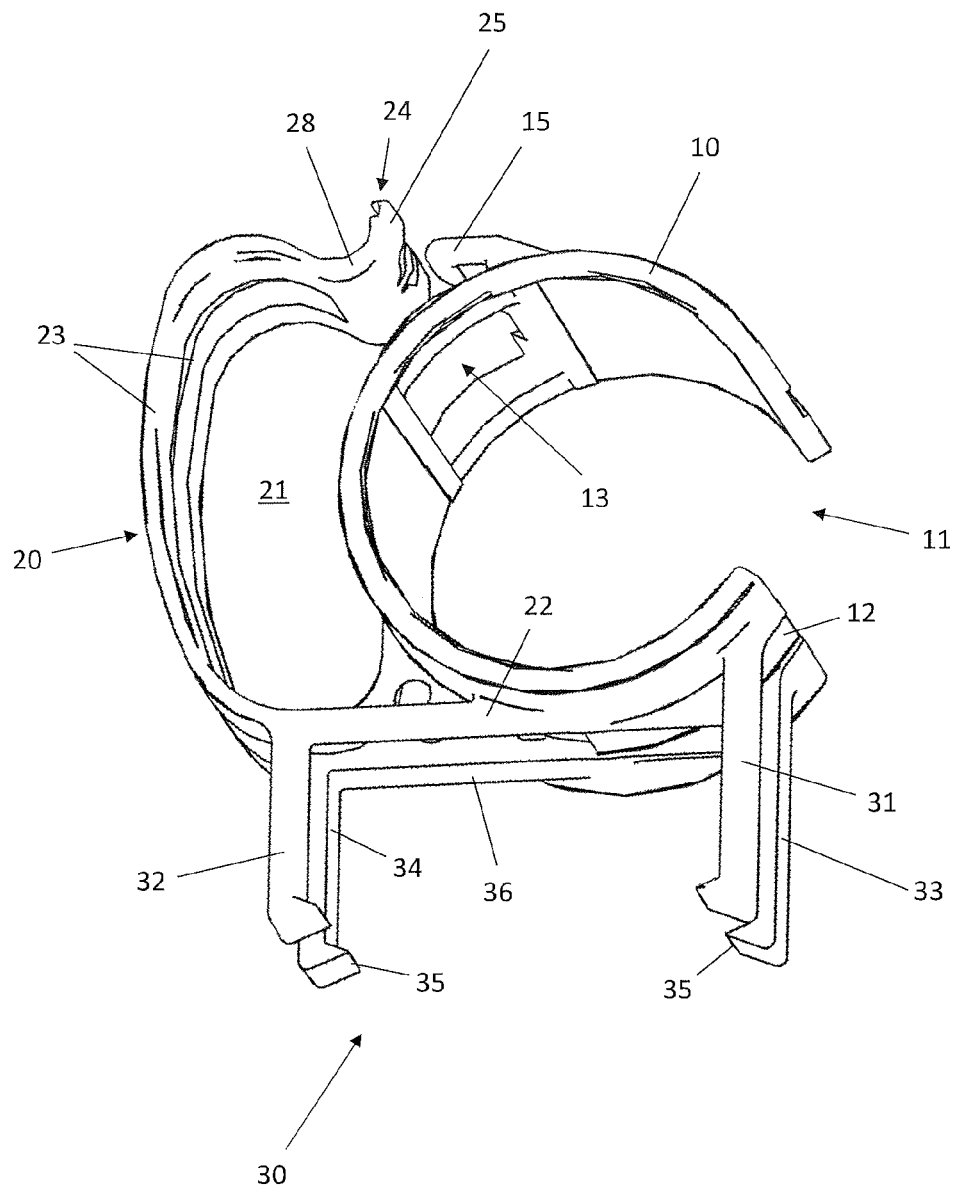
FIG. 3 shows the cable holder in a second perspective view.
Figure 4:
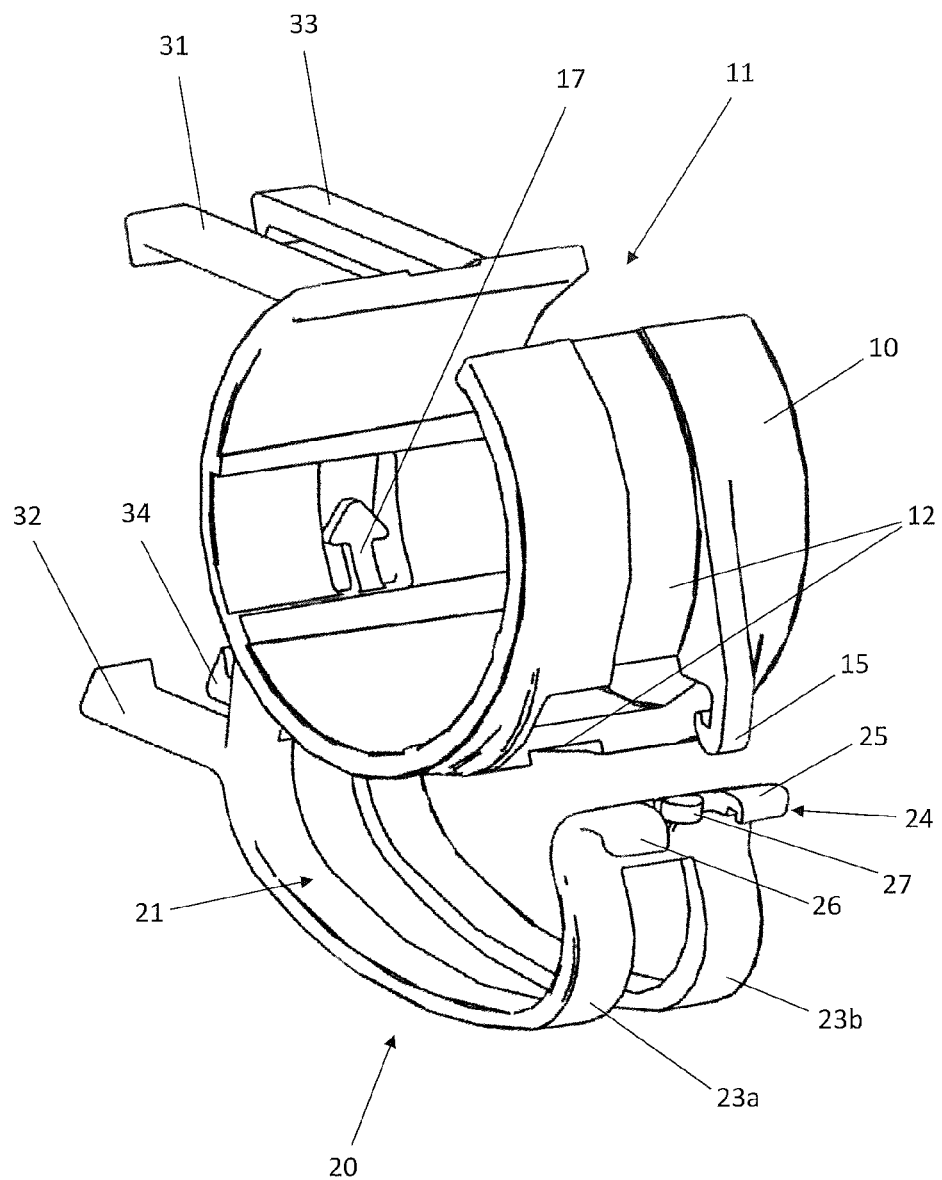
FIG. 4 shows the cable holder in a third perspective view.

FIGS. 2 to 4 each show the cable holder in a perspective view. The features already described, as well as other features of the cable holder, can be seen in the different views.

As can be seen in FIGS. 2 and 4 in particular, the ring hook 15 on the fastening ring 10 and, co-operating with the ring hook 15, the bracket hook 25 on the holding bracket 20 are arranged in axial asymmetry. The bracket hook 25 only forms an axial end region of the free bracket end 24 and does not even extend axially as far as the middle of the holding bracket 20. Its breadth which is axially small as compared to the holding bracket 20, and the axially asymmetrical arrangement of the bracket hook 25, facilitate the insertion of cables. The respective cable can be placed obliquely at the free bracket end 24, such that it can firstly be pushed towards the cable accommodation 21 in the axial portion next to the hooks 15 and 25 and then pushed in the portion between the hooks 15 and 25. At the free bracket end 24, an insertion lip 26 which is formed axially next to the bracket hook 25 extends outwards away from the fastening ring 10 in order to facilitate placing and inserting the respective cable in this axial portion of the holding bracket 20. The insertion lip 26 is U-shaped in cross-section, wherein the open side of the U-shaped insertion lip 26 points outwards, away from the fastening ring 10. The external limb of the "U" is aligned such that when a cable is inserted, the holding bracket 20 is bent open, outwards and away from the fastening ring 10, by the pressing cable.

The holding bracket 20 and the socket mounting 30 are each axially partitioned, starting immediately from the fastening ring 10. Due to this axial partition, the cable holder can serve as a friction protector for the bearing structure when it is fitted, i.e. when the bearing structure is fastened and suspended on a ceiling using a bearing rope. Due to the axial partition, the bearing rope can wind around the fastening ring 10. A guide 12 for the bearing rope extends in the circumferential direction at the outer circumference of the fastening ring 10. The guide 12 prevents the bearing rope from slipping axially. In the example embodiment, the guide 12 is formed as a flat recess at the outer circumference of the fastening ring 10.

The holding bracket 20 is axially partitioned in that it comprises a bracket strip 23a which is on the left-hand side in FIGS. 2 and 4 and a bracket strip 23b which is on the right-hand side in FIGS. 2 and 4, wherein the bracket strips 23a and 23b extend from the outer circumference of the fastening ring 10 almost up to the free bracket end 24, next to each other at a clear distance. In the region of the free bracket end 24, however, the bracket strips 23a and 23b are connected to each other. The bracket hook 25 is formed as an extension of the bracket strip 23b in the circumferential direction. The insertion lip 26 is formed as an extension of the other bracket strip 23a in the circumferential direction.

The socket mounting 30 is axially partitioned in that the socket holding structures 31 and 32 are for their part axially partitioned from the free end up to and immediately onto the fastening ring 10, such that the socket holding structure 31 is sub-divided into an axially left-hand socket holding structure 31 and an axially right-hand socket holding structure 33, and the socket holding structure 32 is sub-divided into an axially left-hand socket holding structure 32 and an axially right-hand socket holding structure 34. A clear distance axially remains between the socket holding structures 31 and 33, from the free end up to the fastening ring 10. Likewise, an axially clear distance remains between the socket holding structures 32 and 34, from their free ends up to the fastening ring 10. The axial distances between the socket holding structures 31 and 33 and between the socket holding structures 32 and 34, and the axial distance between the bracket strips 23a and 23b, is sufficiently large that a bearing rope can be wound around the fastening ring 10 from without, between the pairs of socket holding structures and the bracket strips 23a and 23b.

A circumferential region of the fastening ring 10 which lies radially below the free bracket end 24 of the holding bracket 20 comprises a bracket accommodation 13 (FIG. 2). If the holding bracket 20 yields under the influence of an external force, the bracket end 24 can retreat into the bracket accommodation 13. The bracket accommodation 13 can in particular be formed as a recess at the outer circumference of the fastening ring 10. In the example embodiment, the bracket accommodation 13 is a passage in the fastening ring 10, as is preferred. If a bearing rope winds around the cable holder and/or its fastening ring 10, the bearing rope presses onto the holding bracket 20 in the region of the free bracket end 24. Since the holding bracket 20 can retreat into the bracket accommodation 13, the bearing rope is prevented from damaging the holding bracket 20.

In a circumferential region which lies radially below the free bracket end 24 when the holding bracket 20 is latched, the fastening ring 10 comprises a left-hand and right-hand axial abutment 14 for the latched holding bracket 20. In the example embodiment, in which the fastening ring 10 comprises the bracket accommodation 13, the axial abutments 14 are formed in the region of the bracket accommodation 13. The axially left-hand and axially right-hand side wall of the bracket accommodation 13 form one of the axial abutments each. Since the fastening ring 10 only exhibits a small thickness, the two side walls are extended radially outwards such that the axial abutting function is ensured in the hooked engagement between the ring hook 15 and the bracket hook 25 despite the flatness of the bracket accommodation 13. The axial abutments 14 prevent the hooked engagement between the hooks 15 and 25, which are but comparatively narrow, from being inadvertently released if the hooks 15 and 25 are exposed to an axial load.

In order to be able to fasten a flexible holding means, which preferably can be elastically stretched, on the cable holder, the fastening ring 10 comprises a first holding element 17 and the holding bracket 20 comprises a second holding element 27. The holding element 17 is formed in a circumferential region of the fastening ring 10 between the gap 11 and the holding bracket 20. The holding element 27 is formed at the free bracket end 24. The holding element 27 projects in the first circumferential direction, axially next to the bracket hook 25, at the free bracket end 24. The holding element 17 on the fastening ring 10 projects counter to the first circumferential direction. The holding means can thus be wound around and so fastened on each of the holding elements 17 and 27 and preferably tensed elastically between the holding elements 17 and 27. Such a holding means can be seen in FIG. 5 and is provided with the reference sign 7. If the cable holder comprises a flexible holding means, then the holding means extends in the first circumferential direction from the holding element 17 of the fastening ring 10, between the bracket strips 23a and 23b, through the cable accommodation 21 and up to the holding element 27 of the holding bracket 20. It sub-divides the cable accommodation 21 into an inner region near the fastening ring 10, and an outer region. Because it is fastened on the holding bracket 20, a cable or also as applicable multiple cables can be pushed over the free bracket end 24 into the inner region formed with the holding means, and held on the fastening ring 10 in the inner region by the holding means.

Figure 6:
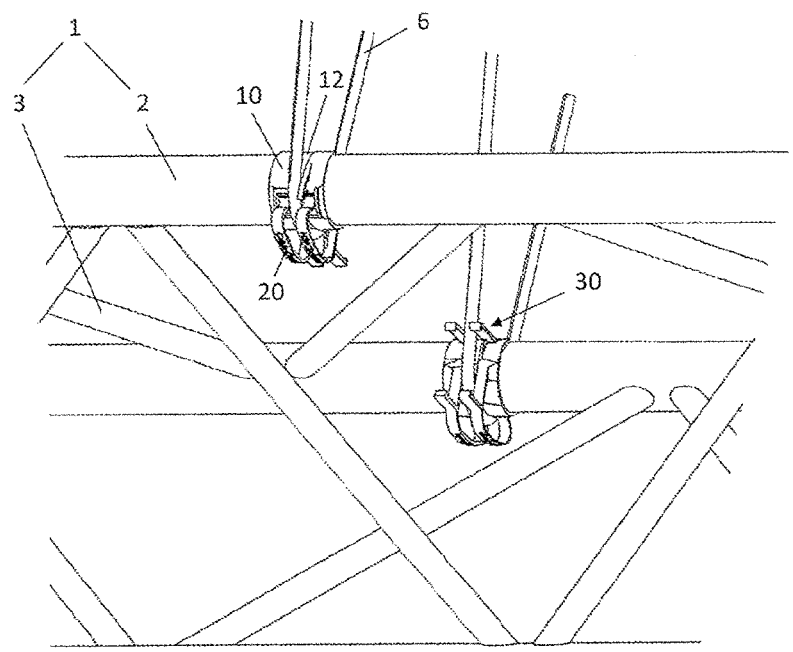
FIG. 6 shows a crossbeam, held suspended on a ceiling by means of bearing ropes, comprising cable holders which are fitted onto chord tubes of the crossbeam and around which the bearing ropes are wound as a friction protector for the chord tubes.

FIGS. 5 and 6 show the cable holder performing the functions mentioned at the beginning.

FIG. 5 shows a crossbeam 1 in the form of a multipoint crossbeam. The crossbeam 1 comprises multiple chord tubes 2, which in typical installations such as for example trade fair installations extend at least substantially horizontally or vertically, and struts 3 which connect the chord tubes 2 to each other and reinforce the crossbeam 1. A cable holder is fitted onto one of the chord tubes 2. The cable holder performs two of the functions mentioned at the beginning, namely that of guiding and/or organising one or more cables 5 and that of fastening an electrical socket 8—in the example embodiment, a multi-outlet socket.

The cable holder is fitted onto the crossbeam 1. As shown, it is preferably fastened on the chord tube 2 of the crossbeam 1. The cable holder can be fastened along the entire free length of the chord tube 2. In the region of a strut 3, the cable holder can be rotated such that the gap 11 in its fastening ring 10 provides space for the strut. This enables otherwise unused regions of the crossbeam 1 to be used and/or the cable holder to (optionally) be secured against twisting. One or more cables 5 and/or other lines can then be pushed under the holding bracket 20 and thus neatly installed. In order to avoid the holding bracket 20 being opened inadvertently, in particular when there are large amounts of cable, the bracket hook 25 of the holding bracket 20 which serves as a locking hook links arms with the ring hook 15 of the fastening ring 10 in order to fix the holding bracket 20. By arranging the bracket hook 25 in axial asymmetry, as is preferred, a large opening for inserting a cable 5 can be obtained in the axial region of the hook-free side of the holding bracket 20 at the free bracket end 24. To facilitate inserting cables, a front insertion lip 26 of the holding bracket 20 can as already mentioned be formed as a rounded intake lip on the hook-free side.

The bracket hook 25 not only serves the purpose of latching but can also prevent the holding bracket 20 from being inadvertently closed when it is not latched. As long as the cables have not yet all been threaded in, the holding bracket 20 abuts against the ring hook 15. The ring hook 15 keeps the holding bracket 20 at a certain distance from the fastening ring 10.

Once the holding bracket 20 has been latched, an axial sideways movement and an associated, inadvertent unlatching of the holding bracket 20 is avoided by positioning it within the bracket accommodation 13 of the fastening ring 10—in the example embodiment, a recessed hole and/or laterally raised edges and/or stabilising fins which serve as axial abutments 14. For latching and unlatching, it is necessary for the free bracket end 24 of the holding bracket 20 to be pressed radially and tangentially inwards and to link arms with the bracket hook 25.

In addition to the basic function of mounting cable, a flexible holding means 7 such as for example a commercially available rubber ring can be suspended on the cable holder, as can be seen in FIG. 5. The holding means 7 is fastened on the holding element 17 of the fastening ring 10 and on the holding element 27 of the holding bracket 20. Starting from where it is fastened on the fastening ring 10, the holding means 7 follows the circumference of the fastening ring 10 until it diverges tangentially and extends towards the free bracket end 24. When being inserted, cables 5 are guided underneath the holding bracket 20 and so automatically underneath the flexible holding means 7 and held on the outer circumference of the fastening ring 10 by the tensed holding means 7. If the bracket hook 25 of the holding bracket 20 links arms, the holding means 7 is additionally tensed.

This optional function ensures that individual cables can also be guided directly on the crossbeam 1 and cannot creep back and forth within the holding bracket 20. Additionally, the holding means 7 generates an additional resistance when pulling on the cable, such that cable sagging between two cable holders can be reduced and/or stiff cable can be flattened. This additional function can in particular be helpful in the case of vertical cable paths.

It has hitherto been difficult to fasten sockets to crossbeams or other scaffolds in a neat and practical way. Where they have hitherto been fastened before inserting the plugs, one slot has usually become hidden by adhesive tape or cable ties.

Using the cable holder, the multi-outlet socket 8 is clipped into the socket mounting 30. The socket holding structures 31, 32, 33 and 34 which act as detents engage with the separation seam which is usually available, i.e. the gap 9 in the socket 8, and so lock onto the socket 8. Using the gap 9 enables the height of the socket holding structures 31, 32, 33 and 34 to be reduced. The socket 8 can be released by tilting it slightly or by purposefully pulling it out along the chord tube 2. Two or more socket holders or socket and cable holders can be used to fasten longer socket strips.

Crossbeam systems are often operated in a cantilevered or suspended manner. To this end, an approved bearing means, usually a bearing rope, is fastened on a bearing base construction, such as for example a ceiling or a support, in order to hold the crossbeam system on it in a suspended or cantilevered manner, wherein it is permissible to loop the bearing rope, for example a steel rope, around the chord tubes of the crossbeam and fasten them again at the upper suspension point. It is recommended that a protector be introduced between the steel rope and the aluminium crossbeam in order to prevent constriction and a friction effect between the steel and the aluminium. In one development, the cable holder can provide this recommended protector.

FIG. 6 shows a three-point crossbeam 1, also referred to as a triangle crossbeam, which is fastened and suspended on a ceiling using bearing ropes 6. The crossbeam 1 comprises three chord tubes 2 which extend at least substantially horizontally and are connected to each other by means of struts 3. Cable holders are fitted onto upper chord tubes 2 of the crossbeam 1, wherein in FIG. 6, each of these cable holders is only performing the function of a protector structure for the upper chord tubes 2. The holding bracket 20 and the socket mounting 30 are provided on the cable holders but are not being used. The cable holders can optionally perform one or both of these functions in addition to the protective function.

The holding bracket 20 and the socket mounting 30 are embodied to be axially partitioned, such that a bearing rope 6 can be guided at said location and secured against slipping off the cable holder laterally. Additionally, the guide 12 extends over the circumference of the fastening ring 10 and is formed as a recess, for example a flat guiding groove with a depth of for example 0.5 mm, in which the bearing rope 6 is additionally guided.

The bearing ropes 6 pass through the axially partitioned holding bracket 20 and the axially partitioned socket mounting 30 and wind around the fastening ring 10 of the respective cable holder. The guide 12 extending in the circumferential direction secures the respective bearing rope 6, in addition to the axially partitioned holding bracket 20 and the axially partitioned socket mounting 30, against slipping axially on the cable holder around which it is wound.

So as not to damage the holding bracket 20 in the region of the free bracket end 24 when it is used as a protector structure, the holding bracket 20 disappears into the dedicated bracket accommodation 13 of the fastening ring 10, as it also does when it is latched. This ensures that said region cannot be crushed by the bearing rope 6 being used, even when exposed to heavy loads.

REFERENCE SIGNS 1 crossbeam
2 chord tube
3 strut, brace
4 -
5 cable
6 bearing rope
7 flexible holding means
8 electrical socket
9 socket gap
10 fastening ring
11 gap
12 guide, recess
13 bracket accommodation, recess, passage
14 axial abutment
15 ring hook
16 -
17 holding element
18 -
19 -
20 holding bracket
21 cable accommodation
22 connecting region
23 partitioned bracket portion
23a bracket strip
23b bracket strip
24 bracket end
25 bracket hook
26 insertion lip
27 holding element
28 bracket end portion, swan's neck
29 -
30 socket mounting
31 socket holding structure
32 socket holding structure
33 socket holding structure
34 socket holding structure 35 contact region
36 socket support area

What is claimed is:

1. A cable holder for holding a cable along an at least substantially cylindrical bearing structure, the cable holder comprising:
   a fastening ring which comprises an axially extending gap for laterally fitting it onto the bearing structure and which can be elastically spread in order to widen the gap; and
   a holding bracket which projects radially from the outside of the fastening ring and extends in a first circumferential direction and forms a cable accommodation for the cable and comprises a free bracket end at which the cable can be inserted into the cable accommodation,
   wherein the holding bracket comprises a bracket hook, and the fastening ring comprises a ring hook, and starting from an initial state of the cable holder, the bracket hook can be moved into hooked engagement with the ring hook by pivoting the holding bracket towards the fastening ring, and wherein the holding bracket comprises an insertion lip for a cable at the free bracket end, axially next to the bracket hook.

2. The cable holder according to claim 1, wherein the holding bracket is pivoted towards the fastening ring against a spring force of the holding bracket.

3. The cable holder according to claim 1, wherein the fastening ring comprises an axial abutment which axially secures the bracket hook in the hooked engagement by way of an axial abutment contact with the holding bracket.

4. The cable holder according to claim 1, wherein the free bracket end is broader in the axial direction of the fastening ring than the bracket hook, and the bracket hook is arranged in axial asymmetry in the circumferential direction at or near the bracket end.

5. The cable holder according to claim 1, wherein the fastening ring comprises a bracket accommodation at its circumference with which a bracket portion of the holding bracket which is near the free bracket end engages or into which it can be pressed.

6. The cable holder according to claim 5, wherein the bracket accommodation is a recess in the outer circumference or a passage through the circumference of the fastening ring.

7. The cable holder according to claim 1, wherein a first holding element projects from the fastening ring forming a free end, and/or a second holding element projects from the holding bracket at or near to the free bracket end forming a free end, such that an elongated flexible holding means can be held under tensile stress on the first holding element and/or the second holding element, such that it releasably encompasses the first holding element and/or the second holding element.

8. The cable holder according to claim 7, wherein the first and/or second holding element projects in the circumferential direction.

9. The cable holder according to claim 1, further comprising an elongated flexible holding means which is connected to the fastening ring, with tensile strength in the first circumferential direction, at a first holding element of the fastening ring and connected to the holding bracket, with tensile strength counter to the first circumferential direction, at a second holding element of the holding bracket and which extends through the cable accommodation in the circumferential direction.

10. The cable holder according to claim 1, further comprising a socket mounting for an electrical socket.

11. The cable holder according to claim 1, wherein in an initial state in which it is free of external forces, the fastening ring extends in the circumferential direction over an angle between 180° and 330°.

12. The cable holder according to claim 1, wherein in an initial state in which it is free of external forces, the fastening ring extends in the circumferential direction over an angle between 250° and 300°.

13. The cable holder according to claim 1, wherein in an initial state of the fastening ring in which it is free of external forces, the gap exhibits a clear width over its entire axial length which is at least as large as a maximum width of a strut which projects from the bearing structure, such that the cable holder can be arranged on the bearing structure, surrounding the strut, in the region of the gap.

* * * * *